United States Patent [19]
Wegman et al.

[11] Patent Number: 5,995,114
[45] Date of Patent: Nov. 30, 1999

[54] APPLYING NUMERICAL APPROXIMATION TO GENERAL GRAPH DRAWING

[75] Inventors: Mark N. Wegman, Ossining, N.Y.; Daniel Tunkelang, Pittsburgh, Pa.

[73] Assignee: International Business Machines Corporation, Armonk, N.Y.

[21] Appl. No.: 08/926,871

[22] Filed: Sep. 10, 1997

[51] Int. Cl.[6] .................................................. G06F 15/00
[52] U.S. Cl. ............................ 345/440; 707/100; 706/10
[58] Field of Search ........................... 345/440; 707/100; 706/10

[56] References Cited

U.S. PATENT DOCUMENTS 5,845,270  12/1998  Schatz et al. ....................... 345/440 X

*Primary Examiner*—Mark K. Zimmerman
*Assistant Examiner*—Chantè Harrison
*Attorney, Agent, or Firm*—Whitham, Curtis & Whitham; Jay P. Sbrollini

[57] ABSTRACT

A simple approach to graph layout is fast and results in graphs that lend themselves to full visualization on a standard-sized computer monitor. The algorithm implemented allows the use the same spring and repulsion energies as in the force-directed model, or any other reasonably behaved energy function. In addition, numerical methods, either the technique of polynomial approximation or quadratic approximation, are applied. This allows approximating the minimum or maximum of a general function by picking a small set of points and computing the local optima of a polynomial function that passes through them. Polynomial or quadratic approximation is used to produce candidate drawings and, ultimately, to select a low-energy drawing from these candidates.

16 Claims, 8 Drawing Sheets

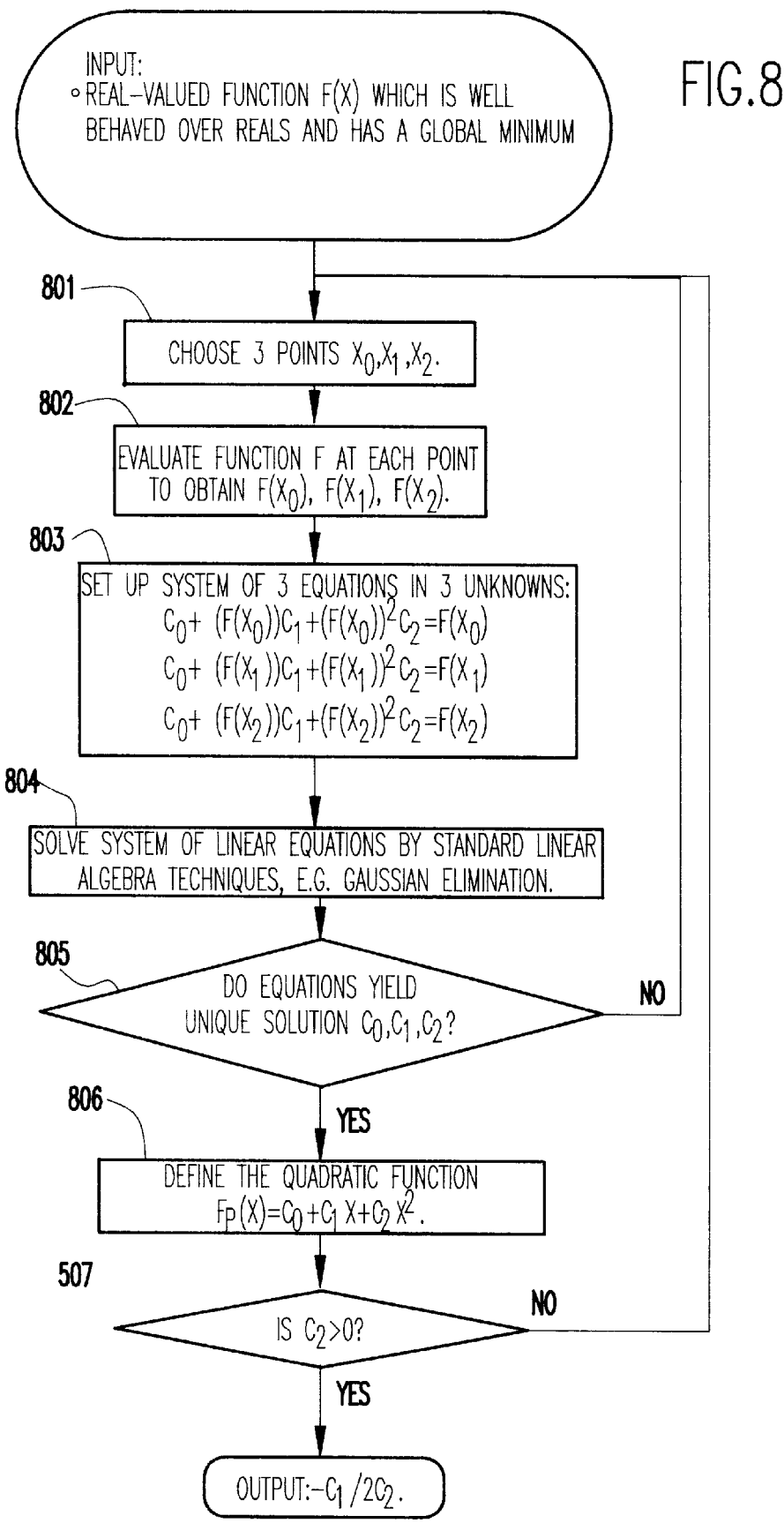

APPLYING NUMERICAL APPROXIMATION TO GENERAL GRAPH DRAWING

BACKGROUND OF THE INVENTION

1. Field of the Invention

The present invention generally relates to computer implemented graph drawing so as to exhibit the structure of the graph through the drawing on a standard-sized computer monitor and, more particularly, to computer implemented graph drawing which combines a force-directed approach with polynomial or quadratic approximation.

2. Description of the Prior Art

Many disciplines of science and engineering use graphs to represent systems comprised of a large number of interacting components, especially when the individual components are simple. Physicists and chemists rely on graphs to model interactions between many particles, as in the case of molecular structure. Electrical engineers use them to represent Very Large Scale Integrated (VLSI) circuits. The use of graphs is particularly important in computer science and information technology. Graphs are a natural representation for most databases and networks. Often, graphical visualizations of such systems reveal far more structure than textual ones, as per the cliche that a picture is worth a thousand words.

A person, however, needs a representation of the graph which is not only visual but readable. The conventional and intuitive way to represent a graph visually is to draw nodes as boxes and edges as line segments connecting the boxes. Even so, there are an infinite number of such drawings for any given graph, since the placement of boxes is arbitrary. Nonetheless, some drawings are more "aesthetic" than others.

Ideally, the aesthetic criteria would specify that the structure of a graph was evident to a human being. This definition, however, is so vague as to itself be an area of active research. Instead, practitioners of graph drawing accept various quantified criteria to establish the "cost" of a drawing and then seek to minimize this cost.

The graph drawing problem is that of arranging the nodes and edges of a combinatorial graph on a geometric space, such as the plane, so as to exhibit the structure of the graph through the drawing. Various existing approaches model the problem physically, treating the nodes as like-charged particles and the edges as springs, and then seeking to minimize the energy of the drawing. These approaches, generally classified as "force-directed," have three problems: speed, quality, and reliability.

In force-directed placement, there are two quantified criteria to minimize: (1) spring energy from the edges and (2) repulsion energy among all the nodes. The first models the edges as springs with an optimal rest length; when they are not at this rest length, they exert a force according to Hooke's Law. This length is either specified for each edge or assumed to be a constant for all edges. The second models the nodes as identically charged particles that repel each other according to Coulomb's Law.

The published algorithms for drawing general graphs (see, for example, G. Di Battista, P. Eades, R. Tamassia, and I. Tollis, "Algorithms for Drawing Graphs: an Annotated Bibliography," *Computational Geometry: Theory and Applications* 4:235–282, 1994) all use the spring/charge model described above, which was initially proposed by P. Eades in "A Heuristic for Graph Drawing", *Congressus Numerantium* 42:159–160, 1984. The principal algorithms in the field are those of T. Kamada and S. Kawai in "An Algorithm for Drawing General Undirected Graphs", *Information Processing Letters* 31:7–15, 1989, T. Fruchterman and E. Reingold in "Graph Drawing by Force-Directed Placement", *Software-Practice and Experience* 21 (no. 11):1129–1164, 1991, R. Davidson and D. Harel in "Drawing Graphs Nicely Using Simulated Annealing", Technical Report CS 89-13, Department of Applied Mathematics and Computer Science, The Weizmann Institute of Science, Rehovot, 1989 (revised July 1993, to appear in Communications ACM), and D. Tunkelang in "A Practical Approach to Drawing Undirected Graphs", Technical Report CS-94-161, School of Computer Science, Carnegie Mellon University, 1994. The last two also assign a cost to edge crossings in the drawing which is linear in the number of crossings.

SUMMARY OF THE INVENTION

It is therefore an object of the present invention to provide a simple approach to graph layout implemented on a computer which is fast and results in graphs that lend themselves to full visualization on a standard-sized computer monitor.

According to the invention, there is provided a computer implemented algorithm which allows the use the same spring and repulsion energies as in the force-directed model, or any other reasonably behaved energy function. The principal innovation of the approach according to the present invention is to apply numerical methods of polynomial approximation, or more specifically the technique of quadratic approximation, to the graph drawing problem. Polynomial approximation allows us to approximate the minimum or maximum of a general function by picking a small set of points and computing the local optima of a polynomial function that passes through them. We use polynomial approximation to produce candidate drawings and, ultimately, to select a low-energy drawing from these candidates. A specific case of polynomial approximation is that of quadratic approximation. Quadratic approximation allows us to approximate the minimum or maximum of a general function by picking three points and computing the apex of the unique parabola that passes through them. We use quadratic approximation to reduce the energy associated with a single node and iterate this process to produce a low-energy drawing.

BRIEF DESCRIPTION OF THE DRAWINGS

The foregoing and other objects, aspects and advantages will be better understood from the following detailed description of a preferred embodiment of the invention with reference to the drawings, in which:

FIG. 8 is a flow diagram showing the logic of the computer implemented quadratic approximation algorithm subroutine for obtaining global minimum of a function.

DETAILED DESCRIPTION OF THE PREFERRED EMBODIMENTS OF THE INVENTION

The preferred embodiment of the invention is implemented on a computer such as an IBM RS/6000 work station running AIX, IBM's version of the UNIX operating system, or an IBM personal computer running the Windows or OS/2 operating systems.

Figure 1:
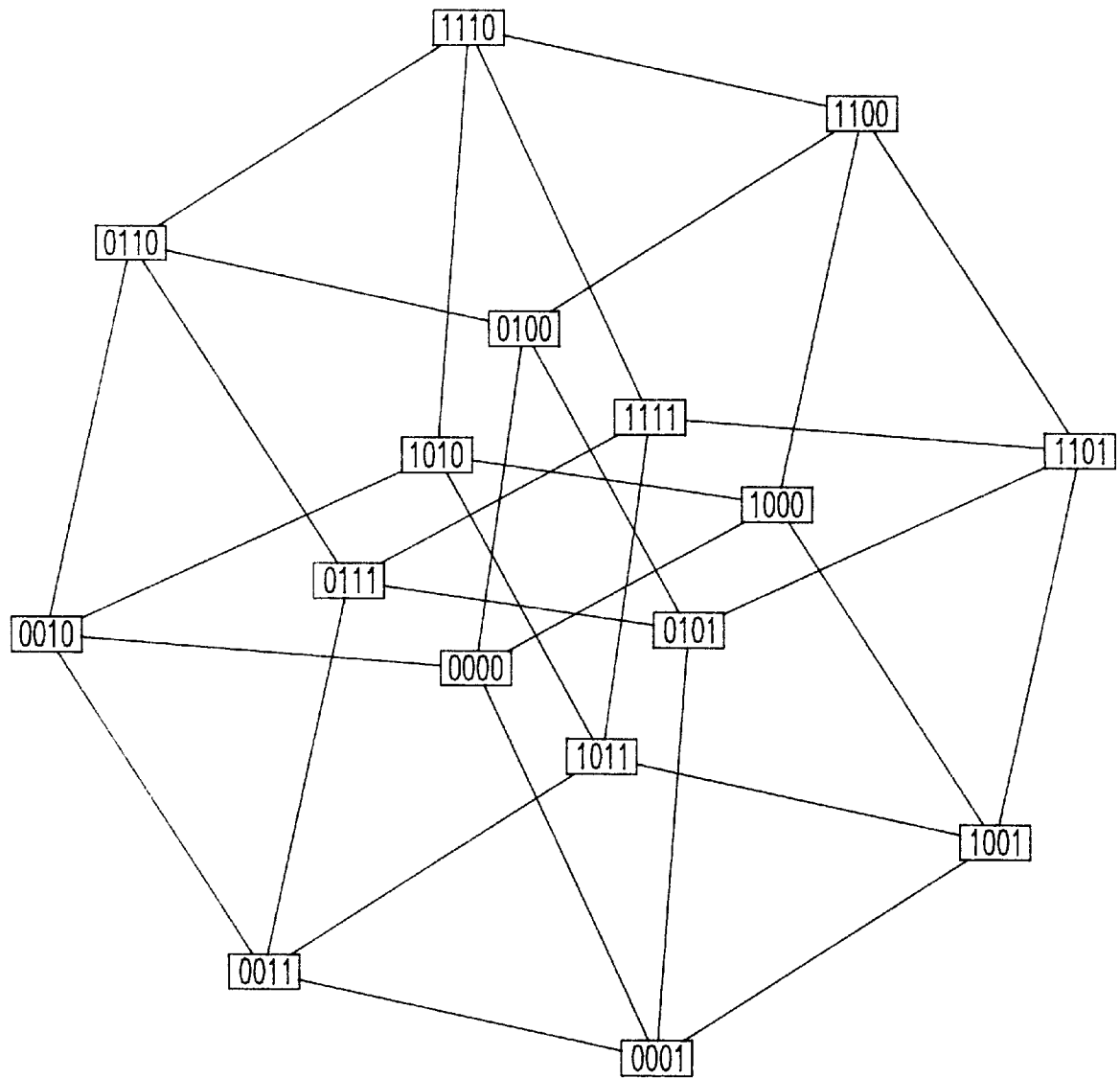
FIG. 1 is a first illustration of an example graph drawn by the procedure according to the invention.

Referring now to the drawings, and more particularly to FIG. 1, there is illustrated an example of a graph of the type which can be drawn using the computer implemented method according to the invention. This particular example is a hypercube, a four-dimensional analog of a cube. The hypercube, in addition to being interesting for its combinatorial properties, is an example of the kind of network used in parallel computation. In such a network, the nodes would represent processors, and the edges would represent links by which these processors communication.

Figure 2:
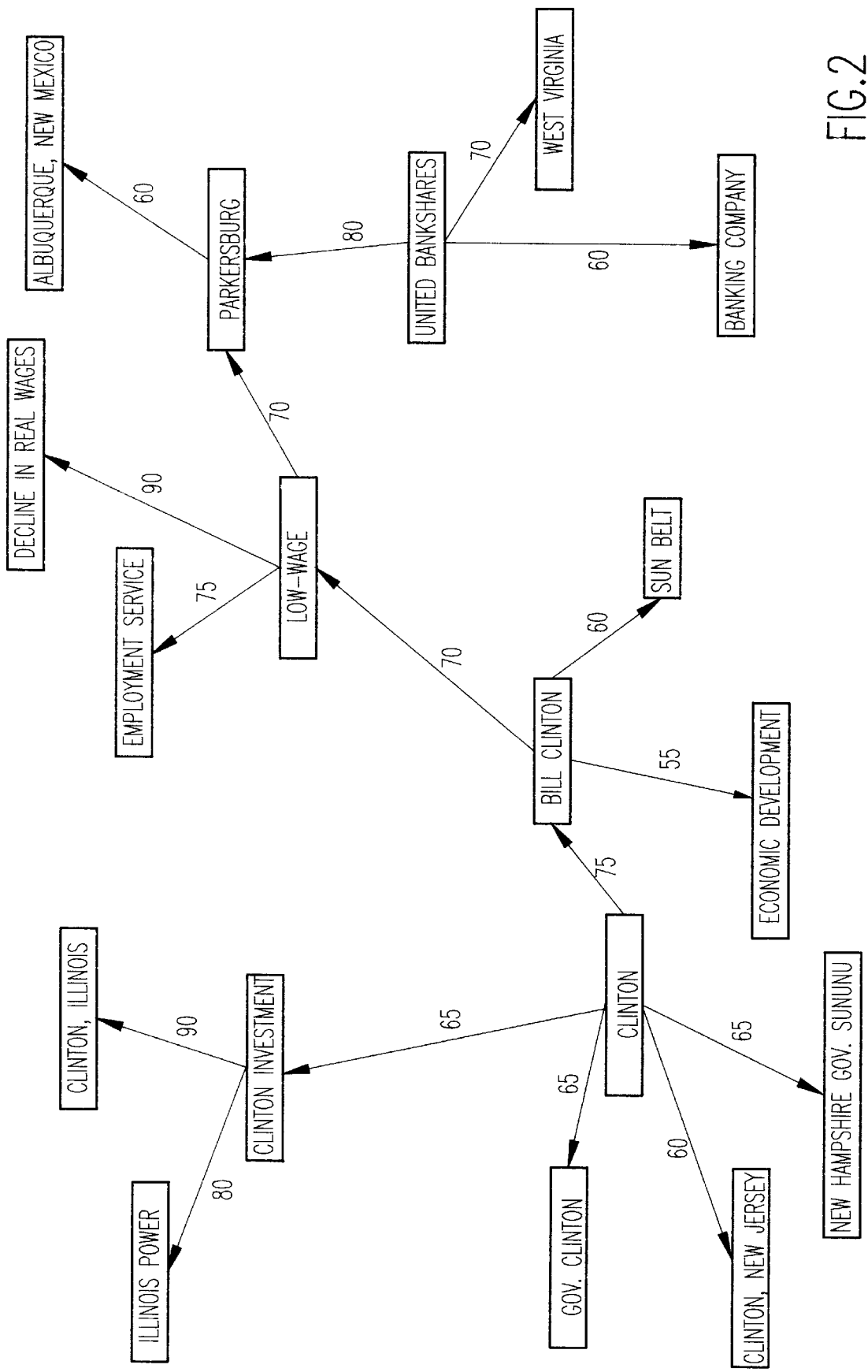
FIG. 2 is a second illustration of an example graph drawn by the procedure according to the invention.

We have also tested the algorithm in the incremental context of Lexical Navigation. An example is shown in FIG. 2 where the nodes represent terms in a "lexical network" database, while the edges represent statistical correlations whose strength (0 to 100) is indicated by the edge label. Here, the nodes are added one at a time as the user "navigates" through a semantic network relating terms in a database.

Lexical navigation allows a user to explore the terms of a database by way of automatically or manually determined relationships among them. A particular application of this process is query refinement in the context of information retrieval, for which the visualized relationships help the user learn how to improve the query.

Not only does the computer implemented algorithm according to the invention produce clear, pleasing layouts, but it also achieves sufficient stability of previously placed nodes to allow the user to maintain a mental map.

Definition of Polynomial Approximation

A polynomial function is a function of the form $f(x)=c_0+c_1X+c_2X^2+ \ldots +c_nX^n$. From calculus, we know that a function has all of its local minima at values of x where the $f'(x)$, the derivative of the function, is equal to zero. We thus solve the equation: $f'(x)=c_1+2c_2x+3c_3x^2+ \ldots +nc_nx^{n-1}=0$. When n is 2, 3, 4, or 5, we can solve this equation algebraically; when n is greater than 4, we must resort to numerical methods to solve the equation. Note that the case of n=1 is uninteresting, since a linear function has no minimum.

Polynomial approximation of an arbitrary function consists of four steps:

1) Choose a value of n to determine the accuracy of the approximation. The larger the value of n, the better the approximation, but the more intensive the computation.
2) Choose n+1 points and evaluate the function at each point. The choice of points is arbitrary.

In the rare case that the points do not generate a unique polynomial, they can be perturbed to do so.

3) Determine the unique polynomial of degree n that passes through the n+1 points. This is accomplished by writing out the n+1 equations in the n+1 unknowns ($c_0, c_1, c_2, \ldots, c_n$) and solving them by linear algebra or any other technique.
4) Find the local minima of the polynomial either algebraically or numerically and return the best one. If n is between 2 and 5, then the equation setting the derivative equal to zero can solved algebraically; otherwise, in general, it must be solved numerically. The smallest of the local minima if the polynomial approximation of the global minimum of the function.

General Algorithm

The algorithm proceeds in three stages. The first stage gathers information about the graph and determines an initial placement. The second stage generates candidate drawings using polynomial approximation. The third stage chooses one or more drawings from among the candidates.

The first stage is the initialization stage in which information about the graph is gathered. An initial placement for the nodes is then determined.

The second stage is the generation of candidate drawings. On each iteration, generate a small set of drawings by perturbing candidates in the present collection and/or by combining multiple candidates, evaluate each of the drawings in this set, use polynomial approximation to determine a new candidate drawing from the drawings and their evaluations and determine whether to add this new candidate to the collection. The algorithm iterates until finding a satisfactory drawing or a satisfactory set of drawings.

In the third stage, a candidate or a set of candidates is chosen. This is done by determining which candidate has the best evaluation or by determining what subset of the candidates collectively has the best evaluation and then returning the candidate or set of candidates.

Example of Specific Implementation of Algorithm

Here, we give an example of a specific implementation of the polynomial approximation algorithm, fleshing out the stages outlined above.

Stage 1: Initialization

First, gather information about the graph. Here, the information consists of the nodes and edges of the graph, as well as the desired lengths of each edge in the drawing. If the desired length is unspecified, it is assumed to be a default value.

To store the graph, we use two arrays of structures, one for the nodes and one for the edges. The node structure contains two floating point fields for the x and y coordinates. The edge structure contains a single field for its desired length.

Next, determine an initial placement for the nodes. We choose this placement by scattering the nodes randomly on the drawing space.

Stage 2: Generation of Candidate Drawings

This is done by iteration. The steps in each iteration are as follows:

First, generate a small set of drawings by perturbing candidates in the present collection and/or by combining multiple candidates.

We use the force-directed model to determine a resultant force vector on a single node (we cycle through the nodes as we iterate).

We recall that there are two kinds of forces exerted on a node: spring forces from the edges incident to it, and electrical repulsion from all the other nodes.

According to Hooke's Law, the magnitude of the force exerted by a spring is $F=kx$, where k is the spring constant and x is the deviation of the spring from its rest length. The direction, of course, is either towards the other end of the spring or away from it, depending whether x is positive or negative. In our model, k=1.

According to Coulomb's Law, the magnitude of the repulsion force between two charged particles is $$F = \frac{q_1 q_2}{d^2}.$$

Here, we assume that the charges $q_1$, and $q_2$, are all equal to a constant that determines the relative effect of repulsion to the drawing. In our implementation, we set that constant to be 1,000.

Now, we generate a set of three drawings by moving one node in the direction of the resultant force vector on it (following the force-directed model) by three distinct distances.

We determine these distances by normalizing the force vector to unit length, and then multiplying it by the scalar values 1, 2, and 3; i.e., we are using vectors in the direction of the force vector of these three lengths. If the force vector is [x, y], then the normalized force vector is $$\left[ \frac{x}{\sqrt{x^2 + y^2}}, \frac{y}{\sqrt{x^2 + y^2}} \right]$$

and the three vectors are:

$$\frac{x}{\sqrt{x^2 + y^2}}, \frac{y}{\sqrt{x^2 + y^2}}$$

$$\frac{2x}{\sqrt{x^2 + y^2}}, \frac{2y}{\sqrt{x^2 + y^2}}$$

$$\frac{3x}{\sqrt{x^2 + y^2}}, \frac{3y}{\sqrt{x^2 + y^2}}$$

where $\sqrt{x^2+y^2}$ is the square root of the sum of the squares of the force vector components and hence the magnitude of the force vector.

Thus, if the present coordinates of the node are $[n_x, n_y]$, then the three possible new placements are:

$$\frac{n_x + x}{\sqrt{x^2 + y^2}}, \frac{n_y + y}{\sqrt{x^2 + y^2}}$$

$$\frac{n_x + 2x}{\sqrt{x^2 + y^2}}, \frac{n_y + 2y}{\sqrt{x^2 + y^2}}$$

$$\frac{n_x + 3x}{\sqrt{x^2 + y^2}}, \frac{n_y + 3y}{\sqrt{x^2 + y^2}}$$

Second, each of the drawings in this set is evaluated. Again, we compute the energy according the force-directed model; specifically, we compute the energy contributed by the node to the drawing.

We recall that energy is the integral of force. Therefore the spring energy is $E=\frac{1}{2}kx^2$, and the repulsion energy is $$E = \frac{q_1 q_2}{d}.$$

The spring energy contributed by a node is the sum of the spring energies of the edges incident to it; the repulsion energy contributed by node is the sum of all the repulsion energies between it and other nodes. We sum the two quantities to compute, for each of the three candidate placements of the node, the energy the node would contribute to the drawing by that placement.

Third, polynomial approximation is used to determine a new candidate drawing from the drawings and their evaluations. We use the special case of polynomial approximation called quadratic approximation to determine the unique parabola that passes through three points that correspond to the (distance, value) pairs computed in the last two steps, and we generate a candidate that corresponds to the minimum point in the parabola.

For the points chosen in the previous steps, the equations are as follows:

$$f(1)=c_0+c_1(1)+c_2(1)^2$$

$$f(2)=c_0+c_1(2)+c_2(2)^2$$

$$f(3)=c_0+c_1(3)+c_2(3)^2$$

The values on the left-hand side of the equations are those we compute in the previous step. Solving the equations, we get:

$$c_1=-3.5f(1)-6f(2)-2.5f(3)$$

$$c_2=0.5f(1)-f(2)+0.5f(3)$$

We now recall from algebra that the apex of the parabola is at $$x = \frac{-c_1}{2c_s}.$$

Fourth, a determination is made as to whether to add this new candidate to the collection. We replace the previous candidate by the new one, that is, with the node move to its new placement, if it has lower energy. Recalling that the old placement was $[n_x, n_y]$ and that the force vector was $[f_x, f_y]$, the new placement is:

$$\left[ \frac{n_x + f_x x}{\sqrt{x^2 + y^2}}, \frac{n_y + f_x y}{\sqrt{x^2 + y^2}} \right]$$

In the present implementation, the algorithm iterates until the user, who can see the current candidate on the screen, interrupts it.

Stage 3: Choosing a Candidate or a Set of Candidates

This is done by determining which candidate has the best evaluation or by determining what subset of the candidates collectively has the best evaluation, and return the candidate or set of candidates. Since we only keep one candidate, this step simply returns that candidate.

Concrete Implementation

We have implemented the above algorithm in the Java programming language. The results are startlingly fast. In a few seconds, the iterations converge for drawings in the 50-node range. Much larger graphs do not lend themselves to full visualization on a standard-size monitor.

Figure 3:
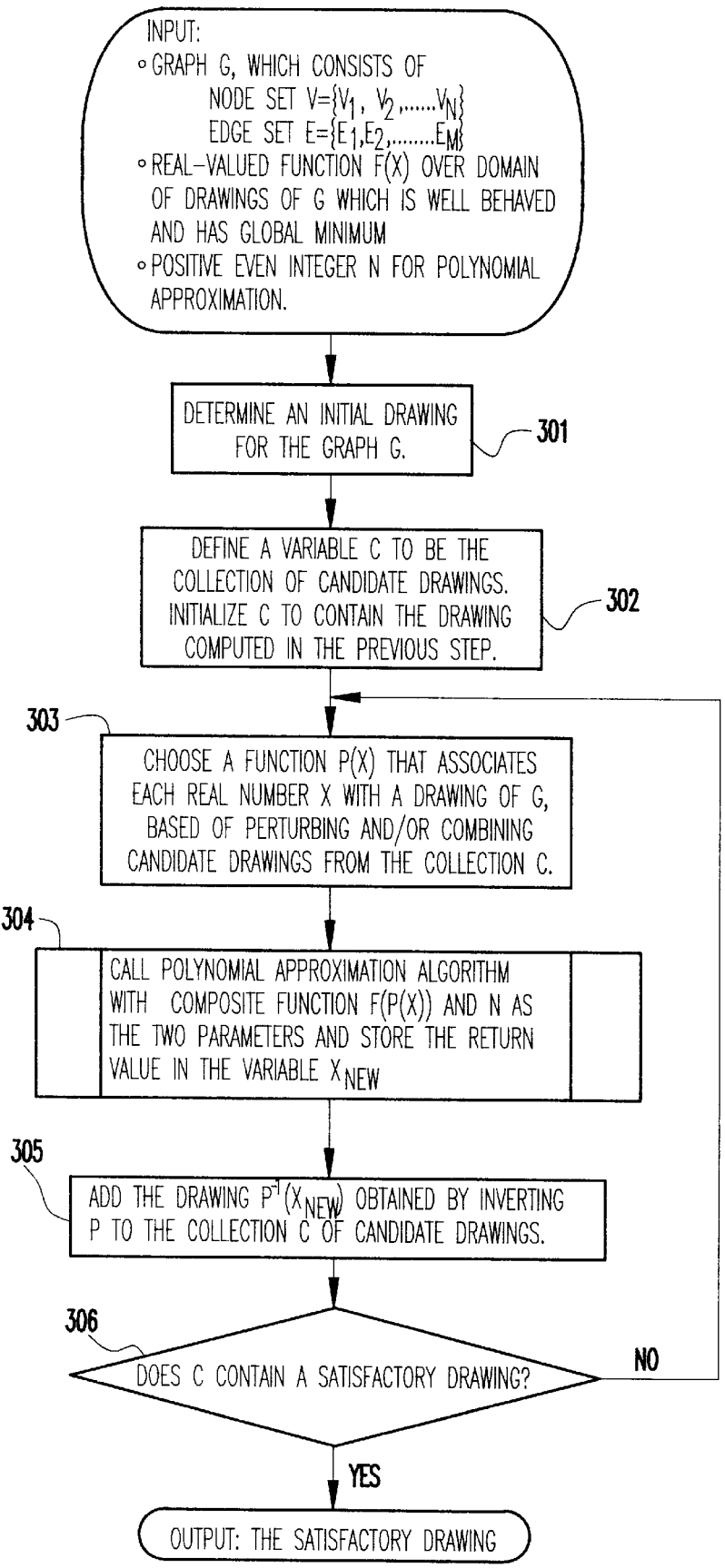
FIG. 3 is a flow diagram showing the logic of the computer implemented polynomial-approximation-based algorithm for graph drawing.

Referring now to FIG. 3, there is shown the flow diagram for the polynomial-approximation-based algorithm for graph drawing as implemented on a computer according to the invention. The inputs are a graph G, which consists of a node set V and an edge set E, a real-valued function f(x) over the domain of drawings of G which is well behaved and has a global minimum, and a positive even integer n for polynomial approximation. The initial drawing for the graph G is determined in function block 301. A variable C is defined in function block 302 to be the collection of candidate drawings. C is initialized to contain the drawing computed in the previous step. Next, in function block 303 a function p(x) is chosen that associates each real number x with a drawing of G, based on perturbing and/or combining candidate drawings from the collection C. A call is made in function block 304 to the subroutine for polynomial approximation shown in FIG. 1. The returned value is stored in the variable $x_{new}$. The drawing $p^{-1}(x_{new})$ is obtained by inverting p, and this drawing is added to the collection C of candidate drawings in function block 305. A test is made in decision block 306 to determine if C contains a satisfactory drawing. If not, the process loops back to function block 303; otherwise, the drawing is output.

Figure 4:
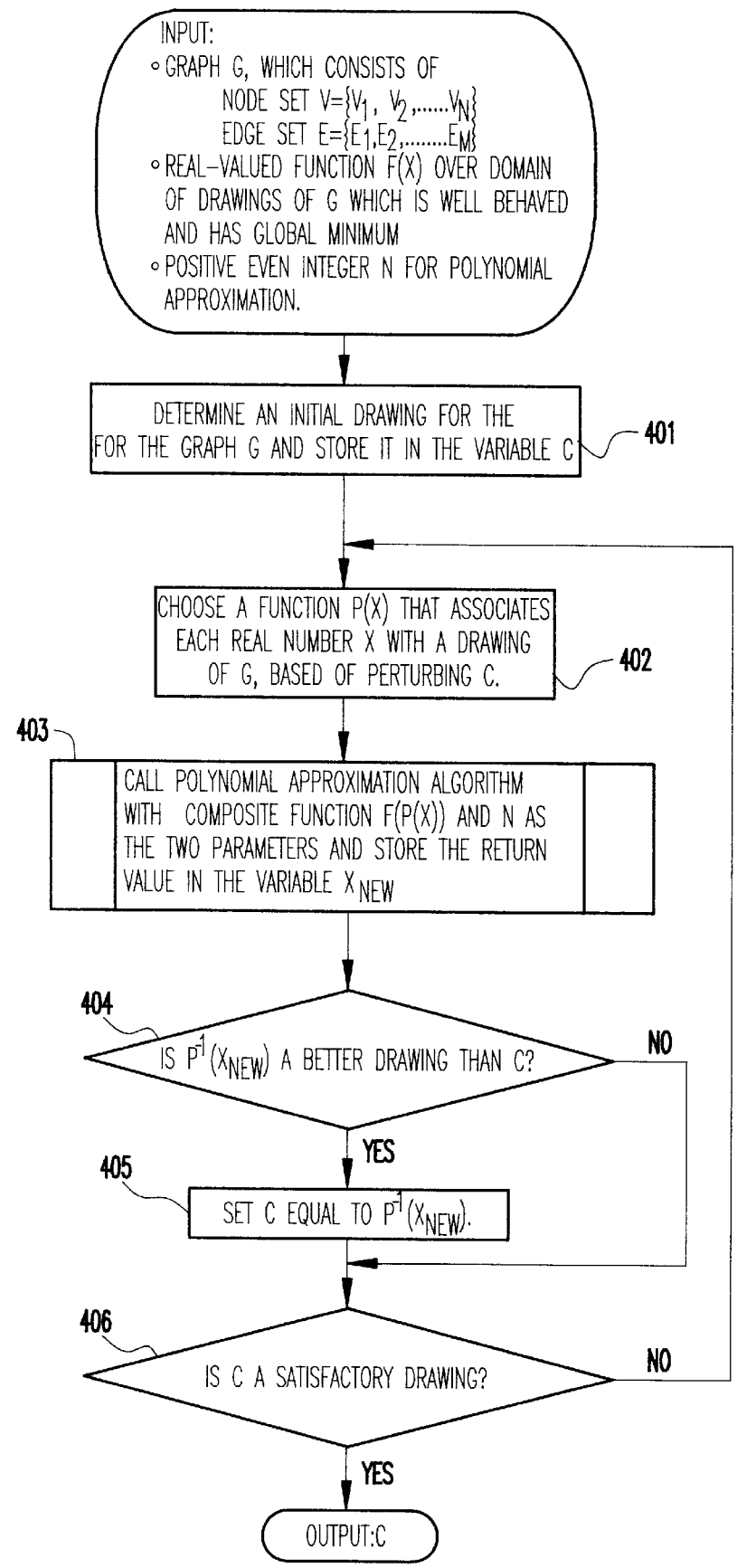
FIG. 4 is a flow diagram showing the logic of the computer implemented single candidate polynomial-approximation-based algorithm for graph drawing.

FIG. 4 is the flow diagram for the single candidate polynomial-approximation-based algorithm for graph drawing as implemented on a computer according to the invention. The inputs are a graph G, which consists of a node set V and an edge set E, a real-valued function f(x) over the domain of drawings of G which is well behaved and has a global minimum, and a positive even integer n for polynomial approximation. The initial drawing for the graph G is determined in function block 401. A function p(x) that associates each real number x with a drawing of G, based on perturbing C, is chosen in function block 402. A call is made in function block 403 to the subroutine for polynomial approximation shown in FIG. 5. The returned value is stored in the variable $x_{new}$. A test is made in decision block 404 to determine if drawing $p^{-1}(x_{new})$, obtained by inverting p, is a better drawing than C. If so, C is set equal to $p^{-1}(x_{new})$ in function block 405; otherwise, there is no change to C. A test is made in decision block 406 to determine if C is a satisfactory drawing. If not, the process loops back to function block 403; otherwise, the drawing C is output.

Figure 5:
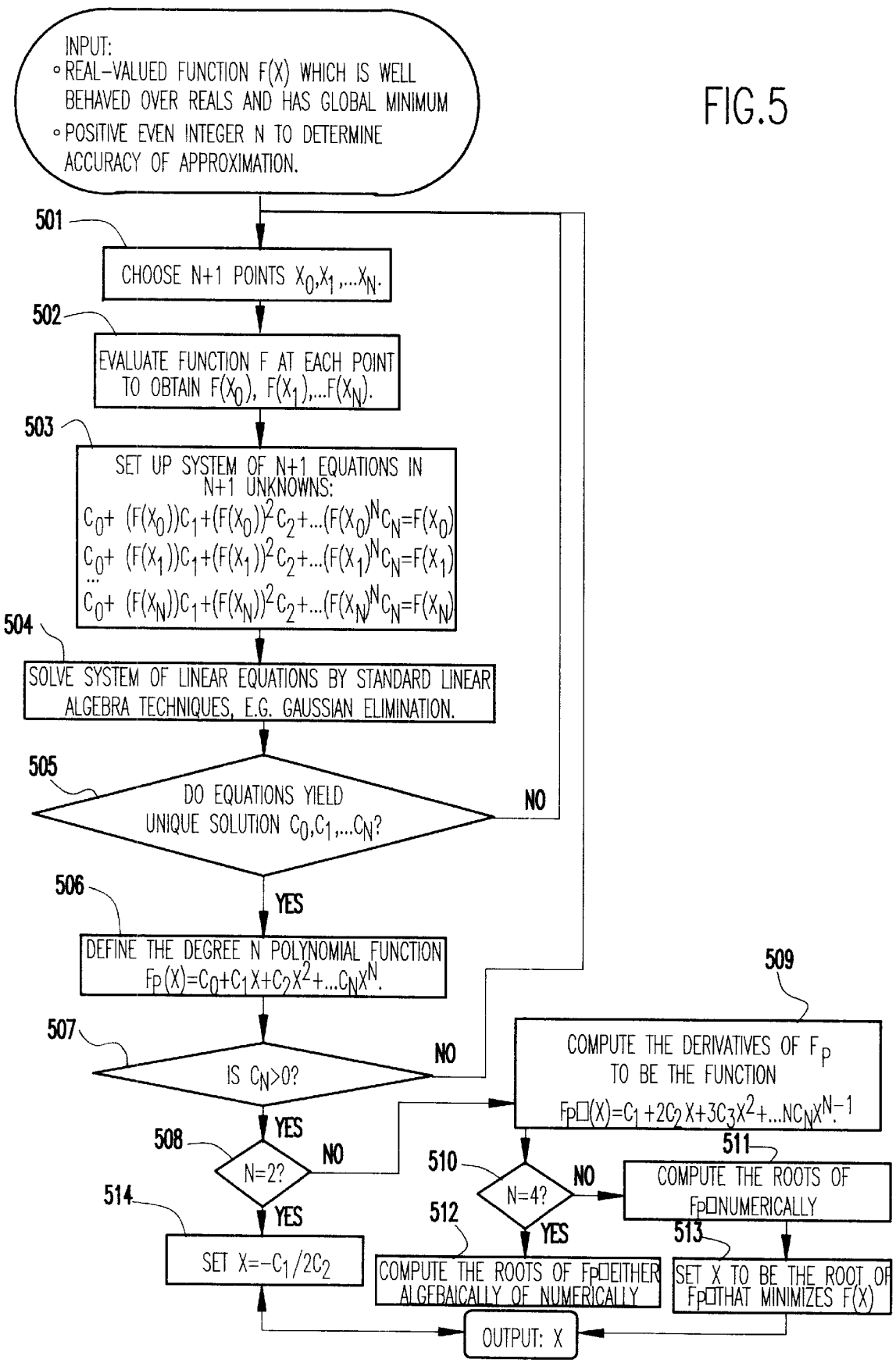
FIG. 5 is a flow diagram showing the logic of the computer implemented polynomial approximation algorithm subroutine for obtaining global minimum of a function.

FIG. 5 shows the flow diagram of the polynomial approximation algorithm subroutine for obtaining global minimum of a function which is called at function block 304 or function block 403 in the flow diagrams of FIGS. 3 and 4, respectively. The inputs are a real-valued function f(x) which is well behaved over the set of real numbers and has a global minimum and a positive even integer n used to determine the accuracy of the approximation. In function block 501, n+1 points $x_0, x_1, \ldots, x_n$ are chosen. Then, in function block 502, the function f is evaluated at each point to obtain $f(x_0), f(x_1), \ldots, f(x_n)$. A system of n+1 equations in n+1 unknowns is set up in function block 503 as follows:

$$c_0 + (f(x_0))c_1 + (f(x_0))^2 c_2 + \ldots (f(x_0))^n c_n = f(x_0)$$
$$c_0 + (f(x_1))c_1 + (f(x_1))^2 c_2 + \ldots (f(x_1))^n c_n = f(x_1)$$
$$\ldots$$
$$c_0 + (f(x_n))c_1 + (f(x_n))^2 c_2 + \ldots (f(x_n))^n c_n = f(x_n)$$

This system of equations is solved in function block 504 by standard linear algebra techniques, as for example, using Gaussian elimination. A test is made in decision block 505 to determine if the equations yield a unique solution for $c_0, c_1, \ldots, c_n$. If not, the process loops back to function block 501 to choose new points and set up a new system of equations to solve. When a unique solution has been found, the degree n polynomial function is defined in function block 506 as $$f_p(x) = c_0 + c_1 x + c_2 x^2 + \ldots c_n x^n$$

A test is next made in decision block 507 to determine if $c_n$ is greater than zero. If not, the process loops back to function block 501 to choose new points and set up a new system of equations to solve. If $c_n$ is greater than zero, then a further test is made in decision block 508 to determine if n is equal to two. If not, the derivative of $f_p(x)$ is computed in function block 509 as $$f'_p(x) = c_1 + 2c_2 x + 3c_3 x^2 + \ldots nc_n x^{n-1}$$

A test is then made in decision block 510 to determine if n is equal to four. If not, the roots of the derivative $f_p'$ are computed numerically in function block 511. If n is equal to four, the roots of $f_p'$ are computed either algebraically or numerically in function block 512. After the roots of $f_p'$ have been computed, x is set to be the root of $f_p'$ that minimizes f(x) in function block 513, and the resulting approximation of the global minimum of f(x) is output. On the other hand, if n is found to be equal to two in decision block 508, x is set to $$\frac{-c}{2c_2}$$

in function block 114 and the resulting approximation of the global minimum of f(x) is output.

Quadratic Algorithm

The quadratic algorithm is a special case of the polynomial algorithm. The essence of the quadratic algorithm is an iterated process that goes through all the nodes, moving each to locally optimize the energy that it contributes to the total energy of the drawing. The process for each node can be summarized as follows:

1) Compute the resultant force vector that is the vector sum of spring forces and repulsion forces on the node. We then normalize this vector to unit length.
2) Pick three multiples of the normalized force vector; e.g., the normalized vector multiplied by 1, 2, and 3. Compute the energy contributed to the drawing by translating the node by each of these three vectors.
3) Using these three multiples of the vector, perform quadratic approximation to guess at the multiple of the vector that would minimize the energy contributed by the node to the drawing.
4) Compare this hypothesized optimal translation to the present position of the node; if it is an improvement, then move the node there.

5) Repeat steps 2 through 4, replacing the normalized force vector with its perpendicular.

6) Repeat steps 2 through 4, replacing the normalized force vector with a unit vector chosen at random according to a uniform distribution.

Initially, the nodes are placed on the rectangular drawing region randomly, according to a uniform distribution (each node being placed independently). Each iteration then performs the above process for each node of the graph, in sequence (not parallel). The algorithm stops iterating when an iteration does not decrease the total energy of the graph, or when some pre-specified time has elapsed.

Each step will now be explained in detail.

Step 1: Computing the Resultant Force Vector

We recall that there are two kinds of forces exerted on a node; spring forces from the edges incident to it, and electrical repulsion from all the other nodes.

According to Hooke's Law, the magnitude of the force exerted by a spring is F=kx, where k is the spring constant and x is the deviation of the spring from its rest length. The direction, of course, is either towards the other end of the spring or away from it, depending whether x is positive or negative. We assume in our model, without loss of generality, that k=1.

According to Coulomb's Law, the magnitude of the repulsion force between two charged particles is $$F = \frac{q_1 q_2}{d^2}.$$

Here we assume that the charges $q_1$ and $q_2$ are all equal to a constant that determines the relative effect of repulsion to the drawing. Increasing the repulsion constant leads to a more spread out drawing, appropriate when the size of the drawing space is not a bottleneck.

We then normalize the sum of the spring forces and electrical repulsion forces on a node to get the normalized resultant force vector.

Step 2: Computing Energy at Three Points for Quadratic Approximation

We pick three points along the line of the resultant force vector by multiplying the normalized vector obtained in the previous step by 1, 2, and 3. We then compute the energy contributed to the total energy of the drawing by translating the node from its current position by each of these three vectors. We recall that energy is the integral of force. Therefore the spring energy is E=½kx², and the repulsion energy is $$E = \frac{q_1 q_2}{d}.$$

The spring energy contributed by a node is the sum of the spring energies of the edges incident to it; the repulsion energy contributed by node is the sum of all the repulsion energies between it and other nodes. We sum the two quantities to compute, for each of the three candidate placements of the node, the energy the node would contribute to the drawing by that placement.

Step 3: Performing Quadratic Approximation

We now have three pairs (point, value) that we can use for quadratic approximation. We recall that the equation for a parabola is f(x)=ax²+bx+c. Here, the variable x stands for the scalar multiple of the normalized resultant force vector. With the three points, we interpolate a parabola by solving the following system of three equations in three unknowns:

$$f(1)=a(1)^2+b(1)+c$$

$$f(2)=a(2)^2+b(2)+c$$

$$f(3)=a(3)^2+b(3)+c$$

The values on the left-hand side of the equations are those we compute in the previous step. Solving the equations, we get:

$$a=0.5f(1)-f(2)+0.5f(3)$$

$$b=-3.5f(1)-6f(2)-2.5f(3)$$

We now recall from algebra that the apex of the parabola is at $$x = \frac{-b}{2a}.$$

Step 4: Reducing the Energy of the Drawing

We now see if moving the node by the multiple of the normalized resultant force vector computed in the previous step actually reduces the energy of the drawing. We do so by computing the energy contributed by the node at its current placement and comparing it to the energy it would contribute if we moved it to the hypothesized optimal placement along the line of the force vector. If the movement reduces the energy, then we perform it by moving the node. If the old node coordinates were $[n_x\ n_y]$, the normalized force vector were $[f_x\ f_y]$, and the apex of the parabola from the previous step was at $x=x_{opt}$, then the new node coordinates would be $[n_x+x_{opt}f_x\ n_y+x_{opt}f_y]$.

Step 5: Using the Perpendicular of the Force Vector

We now repeat steps 2 through 4, using the perpendicular of the force vector. Using the perpendicular ensures that the node does not get stuck along a line, as would happen in the scenario that three mutually connected points (i.e., a triangle) were initially placed collinearly. If only the force vectors could be used for movement, they would remain collinear throughout the algorithm, since all the forces would remain along that line.

Step 6: Using a Random Vector

The idea here is similar to that of the previous step: to allow for useful perturbations in the drawing, we repeat steps 2 through 4 using a random unit vector in the place of the resultant force vector.

Implementation

We have implemented the above algorithm in Java using a repulsion constant (i.e., the square of the constant charge) of 100,000. The results are startlingly fast: in a few seconds, the iterations converge for drawings in the 50-node range. Much larger graphs do not lend themselves to full visualization on a standard-size -monitor.

We have also tested the algorithm in the incremental context of Lexical Navigation. Here, the nodes are added one at a time as the user "navigates" through a semantic network relating terms in a database. Not only does the algorithm produce clear, pleasing layouts, but it also achieves sufficient stability of previously placed nodes to allow the user to maintain a mental map.

Figure 6:
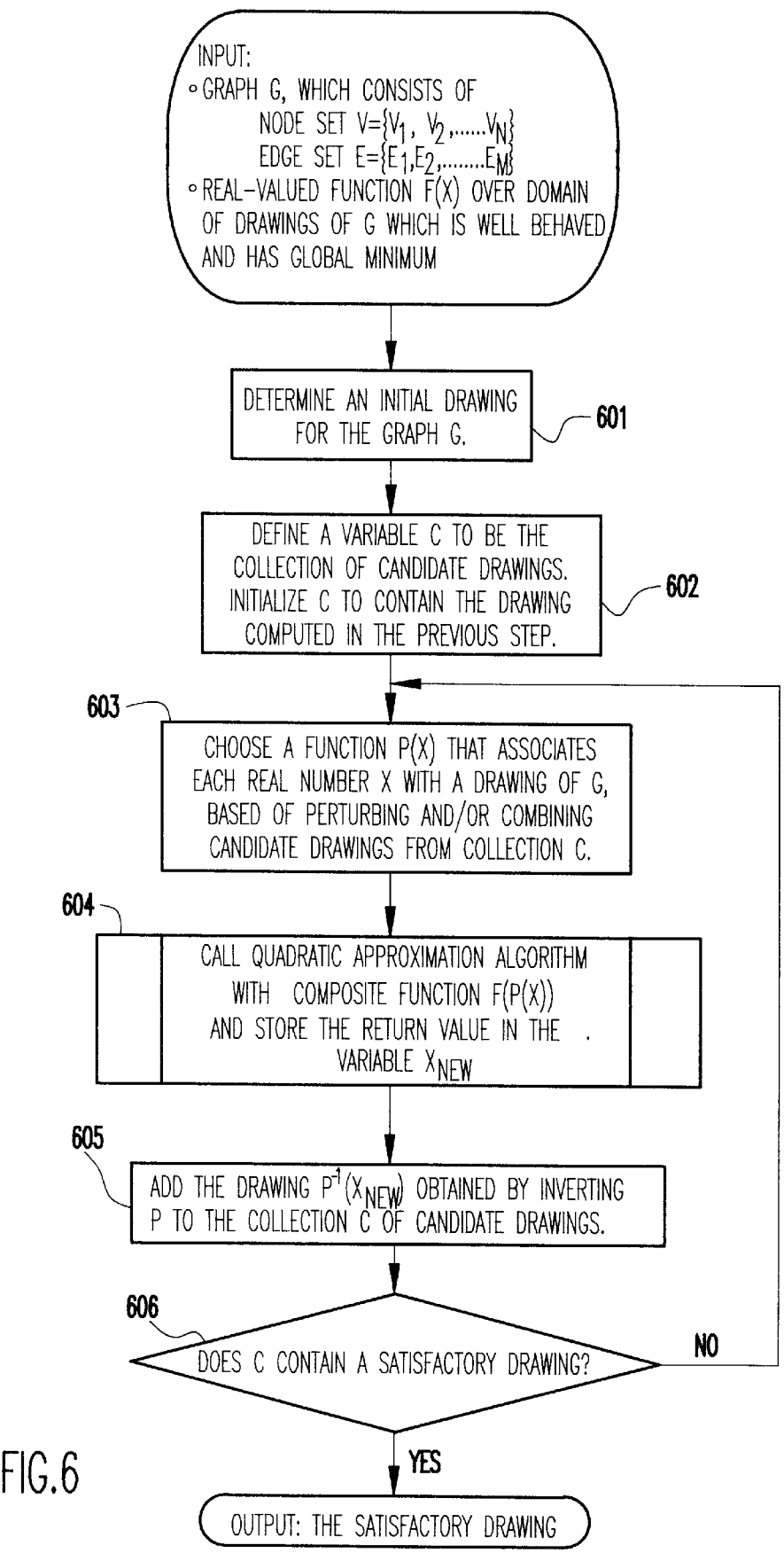
FIG. 6 is a flow diagram showing the logic of the computer implemented quadratic-approximation-based algorithm for graph drawing.

FIG. 6 is the flow diagram for the quadratic-approximation-based algorithm for graph drawing as implemented on a computer according to the invention. The inputs are a graph G, which consists of a node set V and an edge set E and a real-valued function f(x) over the domain of drawings of G which is well behaved and has a global minimum. The initial drawing for the graph G is determined in function block 601. A variable C is defined in function block 602 to be the collection of candidate drawings. C is initialized to contain the drawing computed in the previous step. Next, in function block 603 a function p(x) is chosen that associates each real number x with a drawing of G, based on perturbing and/or combining candidate drawings from the collection C. A call is made in function block 604 to the subroutine for quadratic approximation shown in FIG. 8. The returned value is stored in the variable $x_{new}$. The drawing $p^{-1}$ ($x_{new}$) is obtained by inverting p, and this drawing is added to the collection C of candidate drawings in function block 605. A test is made in decision block 406 to determine if C contains a satisfactory drawing. If not, the process loops back to function block 603; otherwise, the drawing is output.

Figure 7:
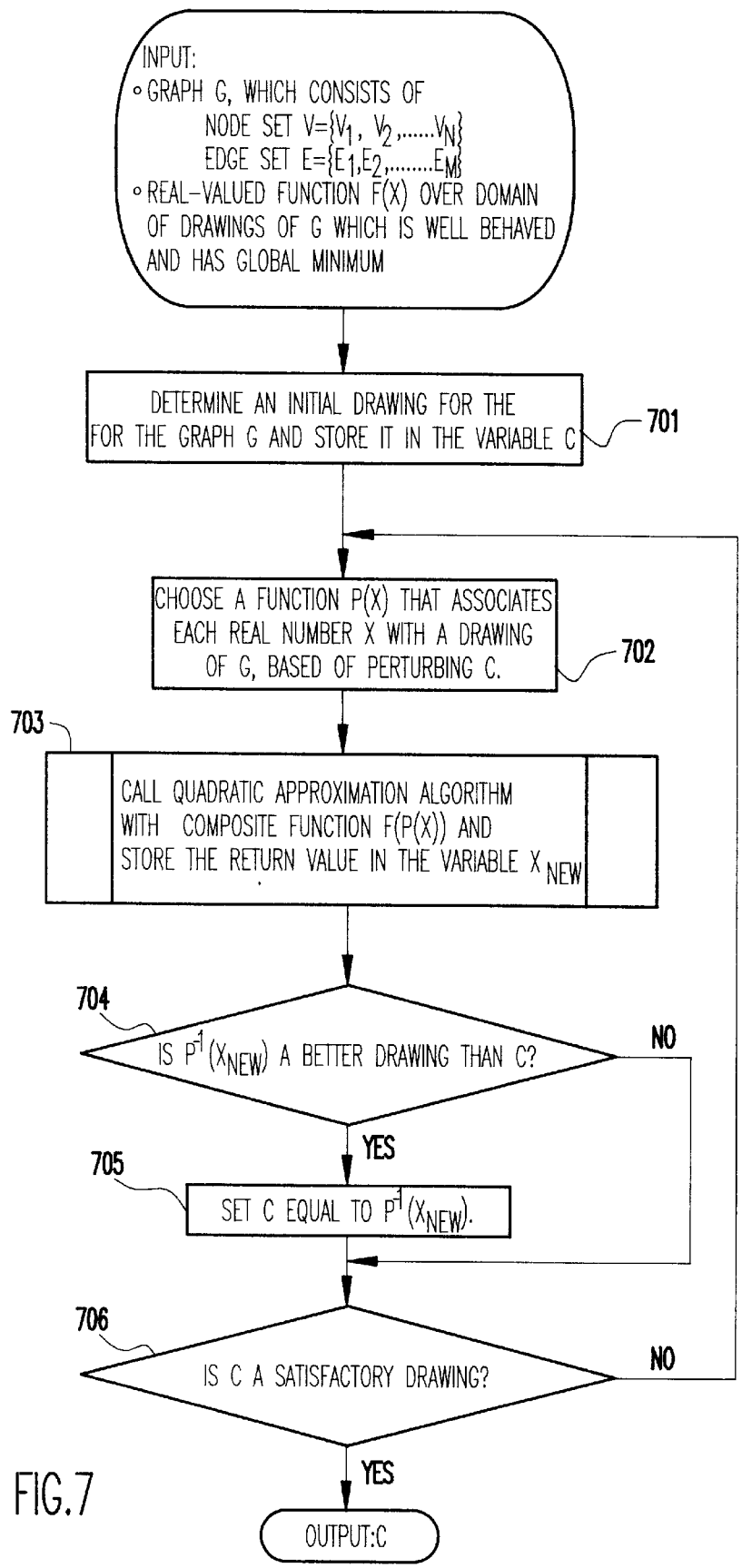
FIG. 7 is a flow diagram showing the logic of the computer implemented single candidate quadratic-approximation-based algorithm for graph drawing.

FIG. 7 is the flow diagram for the single candidate quadratic-approximation-based algorithm for graph drawing as implemented on a computer according to the invention. The inputs are a graph G, which consists of a node set V and an edge set E and a real-valued function f(x) over the domain of drawings of G which is well behaved and has a global minimum. The initial drawing for the graph G is determined in function block 701. A function p(x) that associates each real number x with a drawing of G, based on perturbing C, is chosen in function block 702. A call is made in function block 704 to the subroutine for polynomial approximation shown in FIG. 8. The returned value is stored in the variable $x_{new}$. A test is made in decision block 704 to determine if drawing $p^{-1}$ ($x_{new}$), obtained by inverting p, is a better drawing than C. If so, C is set equal to $p^{-1}$ ($x_{new}$) in function block 705; otherwise, there is no change to C. A test is made in decision block 706 to determine if C is a satisfactory drawing. If not, the process loops back to function block 702; otherwise, the drawing C is output.

The quadratic approximation algorithm for obtaining the global minimum of a function is a special case of the polynomial approximation. The flow diagram for the quadratic approximation called in function blocks 604 and 704 of FIGS. 6 and 7, respectively, is shown in FIG. 8. In this case the input is a real-valued function f(x) which is well behaved and has a global minimum. Three points $x_0$, $x_1$, and $x_2$ are chosen in function block 801. The function f is evaluated at each point to obtain $f(x_0)$, $f(x_1)$, and f ($x_3$) in function block 802. A system of three equations in three unknowns is set up in function block 803 as follows:

$$c_0 + (f(x_0))c_1 + (f(x_0))^2 c_2 = f(x_0)$$

$$c_0 + (f(x_1))c_1 + (f(x_1))^2 c_2 = f(x_x)$$

$$c_0 + (f(x_2))c_1 + (f(x_2))^2 c_2 = f(x_2)$$

This system of linear equations is solved in function block 804 by standard linear algebra techniques, as again for example by Gaussian elimination. A test is then made in decision block 805 to determine if the equations yield a unique solution for $c_0$, $c_1$ and $c_2$. If not, the process loops back to function block 801 to choose three new points and set up a new system of three equations to be solved. When a unique solution is found, the quadratic function $f_p(x) = c_0 + c_1 x + c_2 x^2$ is defined in function block 806. A test is made in decision block 207 to determine if c2 is greater than zero. If not, the process loops back to function block 801 to choose three new points and set up a new system of three equations to be solved; otherwise, the global minimum $$\frac{-c1}{2c_2}$$

is output.

Conclusion

Our approach combines the force-directed approach with polynomial approximation, an idea from the area of numerical methods. Using polynomial approximation, we can quickly reduce the energy of the drawing, and we can thus achieve good drawing in far fewer iterations than the published force-directed algorithms. In addition, our approach generalizes to interesting variations, such as the problem of incremental graph drawing. Our specific implementation has demonstrated that this simple approach to graph layout is a remarkable improvement on the existing force-directed approaches.

There are additional variations and improvements possible. These include implementing the algorithms for three-dimensional layout, further exploring the problem of incremental layout, and developing a concept of parameterized node movement to improve the energy contributed by several nodes (or the whole graph) simultaneously. Therefore, while the invention has been described in terms of preferred embodiments, those skilled in the art will recognize that the invention can be practiced with modification within the spirit and scope of the appended claims.

Having thus described our invention, what we claim as new and desire to secure by Letters Patent is as follows:

1. A computer-implemented method of drawing a graph, comprising steps of:
   gathering information about the graph including a node set and an edge set;
   generating a set of candidate drawings based upon said node set and edge set of said graph, wherein for at least one candidate drawing within said set of candidate drawings
   a second set of drawings is generated,
   at least one new drawing is generated based upon polynomial approximation associated with said second set of drawings, and
   upon determining that said new drawing satisfies a predetermined criterion, said new drawing is added to said set of candidate drawings;
   selecting at least one candidate drawing within said set of candidate drawings; and
   outputting the selected candidate drawing for generating a visual representation of said graph.

2. The method of claim 1, wherein said second set of drawings is generated by perturbing said at least one candidate drawing.

3. The method of claim 1, wherein said second set of drawings is generated by combining drawings with said set of candidate drawings.

4. The method of claim 1, wherein, upon determining that said new drawing satisfies a predetermined criterion said at least one candidate drawing is replaced by said new drawing in said set of candidate drawings.

5. The method of claim 1, wherein the generating step comprises the following steps applied to each candidate drawing within said set of candidate drawings:
   for a given candidate drawing,
   perturbing said given candidate drawing to generate a second set of drawings corresponding to said given candidate drawing;

generating a new drawing based upon a polygonal approximation associated with said second set of drawings corresponding to said given candidate drawing; and upon determining that said new drawing satisfies a predetermined criterion, replacing said given candidate drawing with said new drawing in said set of candidate drawings.

6. The method of claim 1, wherein the generating step comprises the following steps applied to a subset of said set of candidate drawings:

combining a subset of candidate drawings to generate a second set of drawings;

generating a new drawing based upon a polygonal approximation associated with said second set of drawings;

upon determining that said new drawing satisfies a predetermined criterion, including said new drawing in said set of candidate drawings.

7. The method of claim 6, further comprising the step of:

upon determining that said new drawing satisfies a predetermined criterion, removing said subset of candidate drawings from the set of candidate drawings.

8. The method of claim 1, wherein said polynomial approximation is performed in accordance with steps which include:

choosing a univariate function which maps a parameter thereof to a domain of drawings of said graph; and determining a point of said univariate function which maps to an optimal drawing by (i) determining which ones of said second set of drawings have a best evaluation with respect to an evaluation function defined over said domain of drawings and (ii) returning as said set of candidate drawings said ones of said second set of drawings having said best evaluation.

9. The method of claim 8, further comprising:

perturbing at least one of said set of candidate drawings by choosing said univariate function to produce drawings such that points of said univariate function correspond to a continuum of change from a given drawing.

10. The method of claim 9, wherein said second set of drawings is generated by combining drawings within said set of candidate drawings, said combining being perform by choosing said univariate function to parameterize a combination of the drawings such that the points of said univariate function correspond to a continuum of combinations.

11. The method of claim 10, wherein said continuum of combinations includes a convex combination of two drawings.

12. The method of claim 8, wherein said generating step includes:

using a force-directed model to determine a resultant force vector on a single node of said node set;

generating a set of drawings by moving said single node in a direction of said resultant force vector in a predetermined manner;

evaluating each of said set of drawings to determine, based on said model, energy contributed by said single node; and using said polynomial approximation to generate said at least one new drawing based on said evaluating step.

13. The method of claim 12, wherein said force-directed model is based on one of Hooke's law and Coulomb's law.

14. The method of claim 12, wherein said polynomial approximation is a quadratic approximation used to determine a parabola passing through three predetermined points determined based on said force-directed model, and wherein a candidate is generated as one corresponding to a minimum of said parabola.

15. The method of claim 8, wherein said predetermined criterion corresponds to an indication of whether said univariate function is found as a result of said quadratic approximation step.

16. The computer implemented method of graph drawing of claim 1, wherein said step of generating candidate graph drawings includes generating at least one candidate graph drawing by moving at least two of said nodes simultaneously.

* * * * *